United States Patent Office 3,048,546
Patented Aug. 7, 1962

3,048,546
BLEACHING COMPOSITIONS
Donald B. Lake, Wilmington, Del., and Peter T. B. Shaffer, Niagara Falls, N.Y., assignors to E. I. du Pont de Nemours and Company, Wilmington, Del., a corporation of Delaware
No Drawing. Filed July 20, 1960, Ser. No. 44,018
6 Claims. (Cl. 252—95)

This invention relates to solid oxidizing mixtures useful as bleaching and cleansing compositions and methods for using said compositions; more particularly, this invention relates to solid monopersulfate compositions containing a chloride salt to increase the bleaching and cleansing actions of the monopersulfate. This application is a continuation-in-part of copending application Serial No. 642,344, filed February 26, 1957, which was filed as a continuation-in-part of application Serial No. 624,727, filed November 28, 1956, both now abandoned.

The solid oxidizing compositions contain as essential ingredients an alkali metal chloride in admixture with an alkali metal monopersulfate salt. These solid compositions are comparatively stable under storage conditions and are water soluble. Furthermore, they are compatible with detergents, abrasive fillers, and other ingredients such as silicates, phosphates, carbonates and the like that are used in commercial laundering, bleaching and cleanser formulations. The chloride salt not only promotes the bleaching action of the monopersulfate but also serves to increase the antibacterial properties of the compositions.

The solid compositions of the present invention are easily prepared by simply mixing the chloride salt in the desired proportions. Preferred compositions are comprised of sodium chloride and potassium monopersulfate. The proportions of these compositions can vary widely and increased bleaching activity can be readily detected when the weight ratio of sodium chloride to potassium monopersulfate is about 0.1–40/1, respectively. Highly active and preferred compositions have a weight ratio of sodium chloride to potassium monopersulfate of about 1–10/1, respectively. These ranges also embrace other alkali metal chlorides including potassium chloride and sodium monopersulfate which approximated the preferred compounds in effectiveness.

The preferred active oxygen compound, potassium monopersulfate, can be conveniently prepared with potassium bisulfate and potassium sulfate in the form of a triple salt $KHSO_5:KHSO_4:K_2SO_4$ in the mole ratio of about 2:1:1. The triple salt is very stable and contains about 50% by weight of the active oxygen compound; when added to water, a pH of about 2–3 is developed. Sodium and potassium monopersulfates can be used without the bisulfate or sulfate salts; however, a convenient method of preparing potassium or sodium monopersulfate is by reacting a mixture or monopersulfuric and sulfuric acid with the alkali metal carbonate or hydroxide and drying the resulting mixture. The dried mixture corresponds to the triple salt in the above recited ratio. A description of the preparation of these mixtures is disclosed in U.S. Patent 2,802,722.

The active oxygen content of the alkali metal monopersulfate is about 10% by weight. Bleaching solutions will usually contain sufficient monopersulfate to yield about 10–700 p.p.m. active oxygen, depending on the particular use intended. Corresponding chloride ion content is within the range of about 5–140,000 p.p.m.

When used in scouring, the solid composition is used in the form of a slurry and the concentrations of active oxygen and chloride are much higher.

*Example 1*

The following compositions were prepared by intimately mixing together in the proportions indicated, sodium chloride and a composition containing 47.4% $KHSO_5$, the balance being $KHSO_4$ and $K_2SO_4$ (inert) in about equimolar proportions to each other.

| Components | Weight Percent in Composition | | |
|---|---|---|---|
| | A | B | C |
| $KHSO_5$ | 45 | 47 | 24 |
| NaCl | 5 | 1 | 50 |
| inert | 50 | 52 | 26 |

The above anhydrous compositions are stable when kept under anhydrous conditions. When dissolved in water to give solutions containing about 50 to 700 p.p.m. of active oxygen, the resulting solutions are highly effective for bleaching as illustrated in the examples. Solutions containing less than 50 p.p.m. active oxygen, about 10–30 p.p.m., are employed as preventive bleaching solutions in detergent formulations.

*Example 2*

The following scouring compositions were prepared by intimately mixing together an abrasive filler, sodium chloride and a composition containing 47.4% $KHSO_5$, the balance being $KHSO_4$ and $K_2SO_4$ in about equimolar proportions.

| Components | Weight Percent in Composition | | | |
|---|---|---|---|---|
| | A | B | C | D |
| Abrasive filler and inert | 87.6 | 93.4 | 7.6 | 93.4 |
| Potassium monopersulfate | 2.4 | 1.4 | 2.4 | 1.4 |
| Sodium chloride | 10 | 5 | 10 | 5 |

The abrasive filler used in the above formulations was a commercial product containing about 90% of ground quartz flour, about 5% sodium tripolyphosphate, about 3% detergent and a perfume, the remainder being sodium sulfate. The detergent was a sodium alkylaryl sulfonate; when water is added to form a slurry, the pH is 9–10.

The above scouring compositions were substantially more effective in removing stains, such as coffee, ink, and tea stains, from unglazed porcelain surfaces than where similar compositions containing an alkali metal monopersulfate and no sodium chloride, or than the abrasive filler alone.

*Example 3*

A cleanser formulation containing the following ingredients is particularly adapted to erase hard-to-remove stains from porcelain sinks and bowls:

| | Percent by weight |
|---|---|
| $KHSO_5$ | 0.7 |
| NaCl | 20 |
| Detergent (alkyl aryl sulfonate) | 3 |
| Ground silica and inert | 75.8 |

The large amount of chloride salt in this formulation augments the germicidal properties of the formulation and a slurry of this formulation has a pH about 9.

It has been found that the bleaching action of monopersulfate solutions on heat-discolored nylon and other textiles is promoted significantly and beneficially by the presence of chloride ion in the monopersulfate treating solution.

The concentration of the monopersulfate in treating solutions used to bleach fabrics generally should correspond to an active oxygen concentration of at least 50 p.p.m. but not greater than about 700 p.p.m., since higher concentrations can damage the fabric. Active oxygen concentrations of 100 to 400 p.p.m. are preferred. The treating solutions will generally be used at temperatures ranging from 120° F. to the boiling temperature, temperatures of from 180 to 200° F. being preferred. The time required for effective bleaching is inversely related to the temperature used. Thus, at 140° F., effective bleaching may require about one hour as compared with 15 minutes at 200 to 212° F. While temperatures below 120° F., e.g., room temperature, can be used, bleaching at such temperatures is usually too slow for most purposes.

The bleaching treatment can be carried out in any desired manner which will maintain contact of the fabric with the treating solution for a time sufficient to cause effective bleaching. The fabric can simply be immersed for the required time in the treating solution maintained at the chosen temperatures, or the fabric can be passed back and forth through the treating solution.

The preferred compositions containing about 1–10/1 alkali metal salt to alkali metal monopersulfate are particularly active as the below tests illustrate when tea-coffee stained cotton swatches were bleached with a detergent formulation containing sufficient $K_2CO_3$ and $Na_4P_2O_7$ to yield a pH about 9. The active oxygen content was about 25 p.p.m.

HUNTER REFLECTANCE
[blue filter]

| $NaCl/KHSO_5$ | Initial | Final | Percent Stain Removal |
|---|---|---|---|
| 1/1 | 46.1 | 55.4 | 24 |
| 2/1 | 45.5 | 61.2 | 40 |
| 4/1 | 44.5 | 67.0 | 56 |
| 8/1 | 43.2 | 70.8 | 66 |

It will be noted that as the ratio $NaCl/KHSO_5$ is increased the increase in brightness becomes smaller. In the bleaching of fabrics the preferred ratio of chloride salt to monopersulfate salt is 1–10/1; higher ratios do not greatly enhance the bleaching effect. Higher ratios of $NaCl/KHSO_5$ in cleansers impart superior activity until the ratio reaches about 30–40/1. Increasing the amount of chloride in these formulations above 40/1 has little effect in promoting the activity of the monopersulfate salt. Less than 0.1/1 $NaCl/KHSO_5$ will enhance the bleaching effect to some extent, but at least 0.1/1 $NaCl/KHSO_5$ is necessary to increase the bleaching action of the compositions as a practical matter.

*Example 4*

A first solution having a pH of 2.5 to 2.7 and an active oxygen concentration of 300 p.p.m. was prepared by dissolving in 500 ml. of distilled water 3.2 g. of a composition containing the equivalent of 45% potassium monopersulfate ($KHSO_5$), 27% potassium bisulfate ($KHSO_4$) and 28% by weight of potassium sulfate ($K_2SO_4$).

Second and third solutions identical with the first except that they contained, respectively, 12 and 60 p.p.m. of chloride salt (added as sodium chloride), were also prepared.

The above solutions were heated to and maintained at a temperature of 180° F. and in each was immersed a strip (4″ x 24″) of a heat-discolored nylon tricot of the 66-nylon type having a brightness of 69.2 as measured with a Hunter multipurpose reflectometer. After 45 minutes at 180° F., the strips were washed in cold water and dried overnight. The brightness increases for the strips treated in the first (no chloride), second (12 p.p.m. NaCl) and third (60 p.p.m. NaCl) solutions, respectively, were 7.4, 10.3, and 12.9 points. These results show that chloride salt, even at low concentrations, promotes some bleaching.

*Example 5*

The experiment of Example 4 was repeated except that the heat-discolored nylon used had an initial brightness of 75.9. In this case, the brightness increases for strips treated in the first (no sodium chloride), second (12 p.p.m. NaCl) and third (60 p.p.m. NaCl) solutions, respectively, were 3.2, 5.0 and 5.4 points.

*Example 6*

Samples of a heat-discolored nylon were immersed for 1 hour at 180° F. in potassium monopersulfate solutions each having a pH of 2.5 to 2.7 and containing the monopersulfate at a concentration corresponding to 100 p.p.m. of active oxygen. The concentration of chloride salt (supplied as sodium chloride) in the baths was varied from 0 to 120 p.p.m. The ratio of chloride salt to monopersulfate salt is 0.012–0.12/1. The resulting brightness increases were:

| P.p.m. of NaCl in treating solution | Points increase in brightness |
|---|---|
| 0 | 5.7 |
| 12 | 7.7 |
| 60 | 10.0 |
| 120 | 11.6 |

*Example 7*

Samples of a semi-dull nylon taffeta which had a discoloration developed after manufacture of the fabric were bleached by being immersed for 1 hour at 160° F. in potassium monopersulfate solutions each having a pH of 2.5 to 2.7 and containing the monopersulfate at a concentration corresponding to 300 p.p.m. of active oxygen. The first of the two solutions was free of chloride salt. The brihtness increases of the samples bleached in the first and second solutions containing 120 p.p.m. sodium chloride were 13.8 and 15.3 points.

*Example 8*

The procedure of Example 7 was repeated except that the second solution used contained sodium chloride at a concentration of 1200 p.p.m. The brightness increases of the samples bleached in the first with no chloride salt and second (1200 p.p.m. NaCl) solutions, respectively, were 17.1 and 21.6 points. In Example 7, the ratio of $NaCl/KHSO_5$ was 0.04/1; in Example 8 this ratio is 0.4/1.

The preferred monopersulfates are the alkali metal compounds, particularly the sodium and potassium monopersulfates. However, any water-soluble monopersulfate such as the ammonium monopersulfate can be used. The presence of inert salts, such as the potassium bisulfate and potassium sulfate present in the potassium monopersulfate product used in the examples does not adversely influence the desired action of the monopersulfate. Should pH adjustment of the monopersulfate solution be necessary to bring the pH within a preferred range, such adjustment can be made by adding either an acid or an alkali as required.

Examples 4 to 8 show application of the method of the invention to bleaching polyhexamethylene adipamide ("66-nylon"). However, it can also be used effectively to bleach nylons of other types including those described in U.S. Patents 2,071,250; 2,070,251; 2,070,253; 2,130,948; and 2,130,563. The method is also applicable to nylons carrying delustrants such as titanium oxide, which may be present in the nylon in amounts ranging from 0.1 to 10% by weight. Such delustrants do not affect the bleaching action of the monopersulfate. Furthermore, the solid compositions of the present invention can be used to bleach any natural or synthetic textile other than proteinaceous types.

The use of monopersulfate compositions containing chloride salt in accordance with the invention effectively promotes bleaching to a greater increase in brightness per unit of monopersulfate used than is obtainable under comparable conditions in the absence of chloride salt. On the other hand, the same increase in brightness that will require use of a given amount of monopersulfate in the absence of chloride salt can be obtained with a smaller amount of monopersulfate under otherwise the same conditions when chloride salt is present.

The solid compositions of the present invention are especially suitable as stable bleaching and cleansing ingredients that can be used alone or in combination with other ingredients, including detergents, abrasives, silicates, phosphates, carbonates, and other commonly used additives employed in the bleaching and cleansing arts. These solid compositions can be used in both alkaline and acidic solutions and exert antibacterial properties. They can be adapted for home laundry use and packaged in conventional containers. When included in cleansing and scouring formulations, the alkali metal chloride and monopersulfate salts exert abrasive effect and remain stable until used.

The embodiments of the invention in which an exclusive property or privilege is claimed are defined as follows.

We claim:

1. A solid bleaching composition consisting essentially of an alkali metal chloride salt in combination with an alkali metal monopersulfate salt, the ratio of said chloride salt to said monopersulfate salt being about 0.1–40/1, respectively.

2. A solid bleaching composition consisting essentially of an alkali metal chloride salt in combination with an alkali metal monopersulfate salt, the ratio of said chloride salt to said monopersulfate salt being about 1–10/1, respectively.

3. The bleaching composition of claim 1 wherein the chloride salt is sodium chloride.

4. The bleaching composition of claim 2 wherein the chloride salt is sodium chloride.

5. A solid bleaching composition consisting essentially of sodium chloride in combination with potassium monopersulfate, the ratio of sodium chloride to potassium monopersulfate being about 0.1–40/1, respectively.

6. A solid bleaching composition consisting essentially of sodium chloride salt in combination with potassium monopersulfate, the ratio of sodium chloride salt to potassium monopersulfate being about 1–10/1, respectively.

References Cited in the file of this patent

FOREIGN PATENTS

| | | |
|---|---|---|
| 235,757 | Switzerland | May 1, 1945 |
| 197,317 | Austria | Apr. 25, 1958 |